(12) United States Patent
Hotti et al.

(10) Patent No.: US 6,970,876 B2
(45) Date of Patent: Nov. 29, 2005

(54) METHOD AND ARRANGEMENT FOR THE MANAGEMENT OF DATABASE SCHEMAS

(75) Inventors: Timo Hotti, Mountain View, CA (US); Jarmo Parkkinen, Helsinki (FI)

(73) Assignee: Solid Information Technology, Helsinki (FI)

( * ) Notice: Subject to any disclaimer, the term of this patent is extended or adjusted under 35 U.S.C. 154(b) by 479 days.

(21) Appl. No.: 09/851,478

(22) Filed: May 8, 2001

(65) Prior Publication Data

US 2002/0169745 A1 Nov. 14, 2002

(51) Int. Cl.$^7$ ................................................. G06F 7/00
(52) U.S. Cl. .................... 707/101; 707/100; 707/104.1; 707/200
(58) Field of Search ...................................... 707/1–204

(56) References Cited

U.S. PATENT DOCUMENTS

| | | | |
|---|---|---|---|
| 5,806,066 A | | 9/1998 | Golshani et al. |
| 5,974,418 A | * | 10/1999 | Blinn et al. .................. 707/100 |
| 6,343,287 B1 | * | 1/2002 | Kumar et al. ................... 707/4 |
| 6,363,411 B1 | * | 3/2002 | Dugan et al. ............... 709/202 |
| 6,523,036 B1 | * | 2/2003 | Hickman et al. ............. 707/10 |
| 6,615,223 B1 | * | 9/2003 | Shih et al. ................... 707/201 |

FOREIGN PATENT DOCUMENTS

| | | |
|---|---|---|
| EP | 0860788 A2 | 8/1998 |
| WO | WO 00/04445 A1 | 1/2000 |
| WO | WO 00/45286 A1 | 8/2000 |

OTHER PUBLICATIONS

Sheth et al., "Federated Database Systems for Managing Distributed, Heterogenous, and Autonomous Databases", ACM Computing Serveys, vol. 22, No. 3, Sep. 1990, pp. 183–236.*

Sheth et al., "Federated Database Systems for Managing Distributed, Heterogeneous, and Autonomous Databases", 1990, pp 183–236.*

Amit P.Sheth, James A. Larson; Sep. 1990, ACM Computing Surveys, vol. 22, No. 3, pp. 183–236.*

* cited by examiner

Primary Examiner—Greta Robinson
Assistant Examiner—Linh Black
(74) Attorney, Agent, or Firm—Young & Thompson

(57) ABSTRACT

A management of distributed databases, and a method and an arrangement associated with managing database schemas and configuration of software that uses those schemas. A method and a system, which allows managing database schemas and application software in large distributed multi-database systems and avoiding problems that are related to the prior art systems preferably by using a configuration manager apparatus (231), which is external to the configuration and databases being managed (200) or by providing a mechanism for keeping multiple, possibly different database schemas and application software in synchronization. The external configuration management node (231) manages the configuration management replicas (203, 213, 223) in each part (201, 211, 221) of the distributed database system (200). These synchronized configuration management replicas comprise scripts that are used for creating and/or updating the schemas of the database nodes and configuration of software that uses these database nodes (202, 212, 222).

21 Claims, 9 Drawing Sheets

METHOD AND ARRANGEMENT FOR THE MANAGEMENT OF DATABASE SCHEMAS

TECHNICAL FIELD OF THE INVENTION

The invention relates generally to the management of distributed databases, and more particularly to a method and an arrangement associated with managing database schemas.

BACKGROUND ART OF THE INVENTION

The following notions are used in this application:

"Data management system" is an entity, which comprises one or more databases and/or data management systems, whereby the system is responsible for reading the data structures contained in the databases and/or data management systems and for changing these data structures.

"Database" is an information structure, which comprises one or more data elements, and the use of which is controlled by the data management system. The invention is applicable both in relational databases and in databases of other forms, such as in object-oriented databases.

"Data element" is an information structure, which can comprise other data elements or such data elements, which can be construed as atomary data elements. For instance, in a relational database data elements are represented by tables comprising rows. The rows comprise fields, which are typically atomary data elements.

"Database operation" is an event, during which data elements are read from the database, during which data elements of the database are modified, during which data elements are removed from the database, and/or during which data elements are added to the database.

"Transaction" is a plurality of database operations acting on the data elements. A transaction can also comprise further transactions.

"Database Schema" is the structure of a database system, described in a formal language supported by the database management system (DBMS). In a relational database, the schema defines the tables, the fields in each table, and the relationships between fields and tables.

"Database Catalogue" logically partitions a database so that data is organized in ways that meet business or application requirements. Each logical database is a catalogue and contains a complete, independent group of database objects, such as tables, indexes, procedures and triggers. Each of these catalogues can act as a master or replica database. This makes it possible, for example, to create two or more replica databases into one physical database. It is also possible to have one or more catalogues in this same local database that represent master database(s).

"Database Node" is a database catalogue, which has been defined to act as a master or replica and thus participates in a hierarchy of synchronized databases.

"Master database" is a database catalogue in a database synchronization system that contains the official version of synchronized/distributed data. A master database can have multiple replica databases.

"Replica database" is a database catalogue in a database synchronization system that contains a full or partial tentative copy of the master data.

"Publication" is a set of data in a database catalogue that has been published in master database for synchronization to one or multiple replica databases.

"Synchronization" is operation between replica and master database catalogues in which changed data is exchanged between the catalogues. In one known embodiment, this means propagation of Intelligent transactions from replica to master and subscribing to a publication to download changed data from master to replica, [1] EP 0 860 788.

"Schema revision" is a snapshot version of a schema that is identifiable by logical name or version number.

"Schema script" is a script that creates a schema or creates a new revision of an existing schema of a database node.

"Schema subscript" is a schema script that is executed from another schema script.

"Schema script publication" is a system publication that contains the schema scripts of the database hierarchy.

A schema is a representation of the structure of the database that illustrates what kind of data is stored in the database. In distributed database management environments, it must be possible to distribute new schemas as well as modify the existing schemas of the databases of the system in a flexible and controllable manner.

FIG. 1 illustrates an example of prior art database arrangement 100. The database system includes a server 101 with an application master database 102. This application master database includes a schema master of the data stored in the database. The database system also includes two servers 111 and 121 with application replica databases 112, 122. The application replica databases can maintain a full or partial copy (replica) of the application master database servers' data using suitable data synchronization technology, such as functionality disclosed in patent application document [1] EP 0 860 788. The application replica databases include schemas 113, 123, which may be a full or partial copy of the schema 103 of the application master database. Some prior art solutions for managing schemas in distributed database systems are described in documents [2] U.S. Pat. No. 5,806,066, [3] WO 00/45286 and [4] WO 00/04445.

In the prior art implementations schema upgrades are made in the master and these upgrades are distributed to the replicas transparently using some hard-coded rules. This approach introduces some problems that make operating large multi-database systems difficult:

There is no possibility in prior art implementations to control the schema upgrade process programmatically. For instance, sometimes the nature of a schema modification operation require that services for all on-line users of the database are disconnected while the schema is being upgraded. This requires programmatic control over the upgrade process in replica databases.

There is no overall view about the upgrade status of different databases of the system. Failed upgrades are not reported anywhere and the system operator does not necessarily know, which replicas have upgraded to new revision and which have not yet done so.

If the automatic upgrade fails, there is no possibility for error handling and system recovery. There is neither a possibility to prevent such errors. Typically the replica database must be recreated from scratch in this kind of situation.

Upgrading a system where different replicas can have different schemas and where replicas can have local tables that are not defined in the master is a difficult task.

The prior art technology does not support outsourcing the runtime configuration control of distributed systems to third parties.

For these reasons, the database schemas of prior art distributed systems are typically not well manageable.

SUMMARY OF THE INVENTION

The objective of this invention is to present a method and an arrangement, which allows managing database schemas and related application software configuration in large distributed multi-database systems and avoiding said problems that are related to the prior art systems.

The objective of the invention is attained by using a schema and software configuration manager apparatus, which is external to the database nodes and software being managed. This configuration manager apparatus is here referred to as "schema and software configuration management node". The objective of the invention is preferably also attained by providing a mechanism for keeping multiple, possibly different database schemas and their applications in synchronization. The external configuration management node manages the schema and software configuration management replicas in each server of the distributed database system. These synchronized schema/application configuration management replicas comprise scripts that are used for creating and/or updating the schemas of the database nodes and managing the configurations of applications that use the database node. The invention thus provides a solution to the problem of managing schemas of distributed databases and applications that use those databases.

The database schema and application configuration management database node is typically a separate database node that can reside in a database server same as or different from the application database server. If the hierarchies of application database nodes and management database nodes are identical, the management database node can be made a part of the application database node.

One idea of the invention is to utilize relational data synchronization mechanism along with application logic to manage schemas of potentially large number of application database nodes. This allows building large distributed systems with separate but still closely integrated configuration control functionality.

Inventive features in some embodiments according to the invention are:
- Extracting the schema management mechanism from the application's schema to an independent entity,
- Managing all or some of the different schemas and applications of a distributed system in one location,
- Utilizing incremental synchronization mechanism for distributing the new and modified schema and software configuration scripts to the nodes of the system, and
- Utilizing a revision name for detecting the need for schema and application configuration data synchronization, i.e. the schema is upgraded if its revision property does not match with master's respective property.

The "schema management" means here that database objects such as tables, indices, procedures, triggers etc. are amended, added or deleted. The "application configuration management" means here that application software and/or its configuration parameters, security material such as keys and certificates as well as other data and software needed to run the application, are amended, added or deleted. It also means here the management of software and data that is used for verifying consistency and validity of application programs and applications' data of the system.

A database system may include server computers, smart terminals, other terminals and network nodes. A network node may be e.g. a base station controller, access router, optical network router, radio network controller (RNC) controlling a base station controller (BSC), etc. These parts of the distributed database system may have a wireless or wireline connection to the other parts of the system. If a network-based server is used, the application can, in some embodiments, be located and invoked by using the Uniform Resource Locator (URL) of the server. The schema/application configuration management node may also be a server, a client terminal or other node mentioned above, with a wireless or wireline connection to the other servers and terminals, which include parts of the distributed database. The database may be Oracle, Solid, Times Ten, Polyhedra, Clustra or any other database.

With the present invention it is thus possible to remotely manage schemas of distributed databases stored in terminals and various servers and keep the schemas and applications that use the schemas automatically in synchronization. The present invention has several advantages over the prior art solutions:

It is possible to manage the runtime configuration control of distributed systems externally and therefore outsourced services of third parties can be used for providing this function.

It is possible to control the schema and application configuration upgrade process programmatically. For instance, sometimes the nature of a schema modification operation require that services for all on-line users of the database are disconnected while the schema is being upgraded. This requires programmatic control over the upgrade process in replica database nodes.

It is possible to have an overall view about the upgrade status of different database nodes of the system. Failed upgrades can be reported or prevented, and the system operator has the information, which replicas and masters have upgraded to new revision and which have not yet done so.

If the automatic upgrade fails, there is a possibility for error handling and system recovery. There is also a better possibility to prevent such errors, because the control of the schemas of the database system is centralized. It is possible to prevent situations where it is necessary to recreate replica database from scratch.

It is also possible to upgrade a system where different replicas can have different schemas and where replicas can have local tables or local private data in any shared table that are not defined or managed in the master.

Further, together with updating schemas of a database system, it is also possible to update other information of a node using the same updating route and procedures. This may include, for example, updating configuration scripts, updating configuration programs and changing application binaries into a new version level. Schema scripts can also include DML (Data Manipulation Language) or DDL (Data Definition Language) scripts, or any other data manipulation scripts. In some embodiments this is used to set up version information for applications to detect the need for update.

The method according to the invention for managing schemas and/or application configuration in at least one database system comprising at least one application master database and at least one application replica database, wherein at least one of said databases comprises a schema of the data stored in the database, is characterized in that the at least one schema and/or application configuration is managed externally of said at least one application master database and at least one application replica database.

The invention also relates to a storage media comprising a stored, readable computer program, which is characterized in that the program comprises instructions for controlling a data management system or components thereof to implement the method according to the invention.

The invention further relates to a configuration management arrangement for at least one database system comprising at least one server with application master database and at least one server with application replica database, wherein at least one database comprises a schema of the data stored in the database, which is characterized in that the arrangement comprises a configuration management node for managing a database schema and/or application configuration of said at least one database server, wherein said configuration management node is separate from said at least one application master database.

The invention further relates to a configuration management node for at least one database system, comprising means creating and/or updating schemas and/or application configuration of a database system comprising at least one database in at least one database server, wherein the configuration management node is external of said at least one database server.

The best mode of the invention is considered to be a separate updating of replica schema from the master schema.

Some embodiments of the invention are described in the dependent claims.

BRIEF DESCRIPTION OF THE DRAWINGS

Next the invention is described in more detail with reference to embodiments shown as examples and to the enclosed figures, in which.

DETAILED DESCRIPTION

Figure 1:
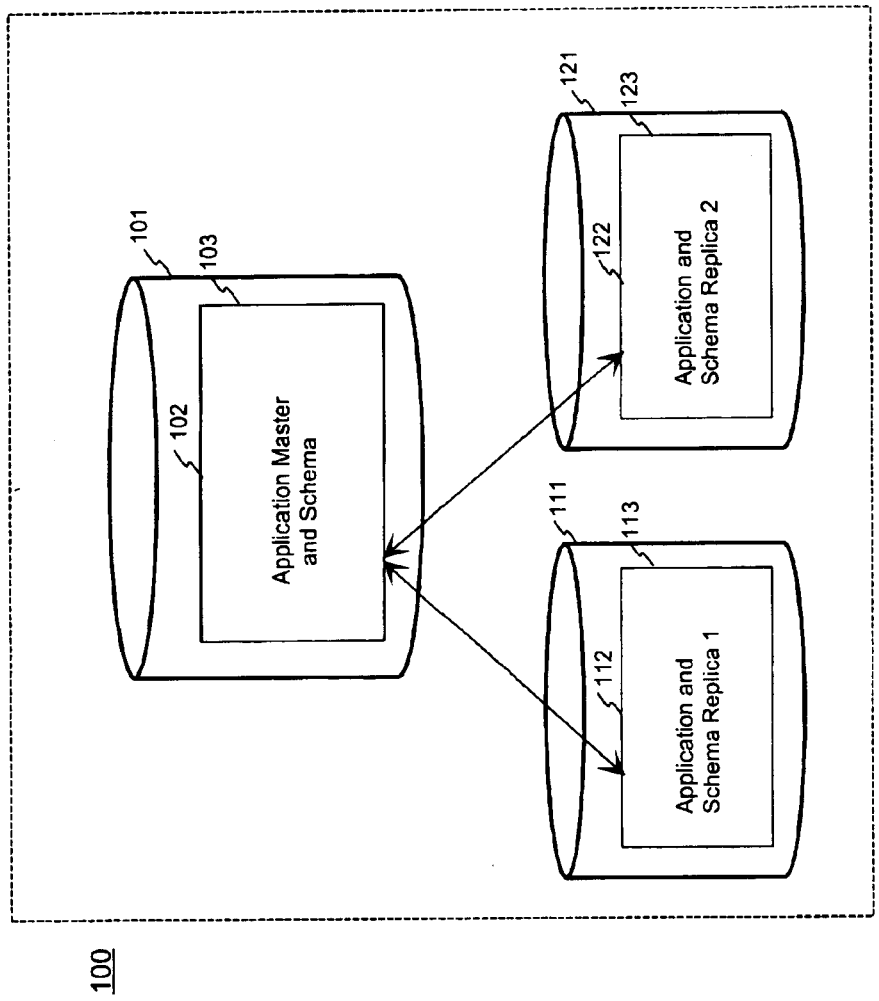
FIG. 1 illustrates a distributed database system according to the prior art.
Figure 2A:
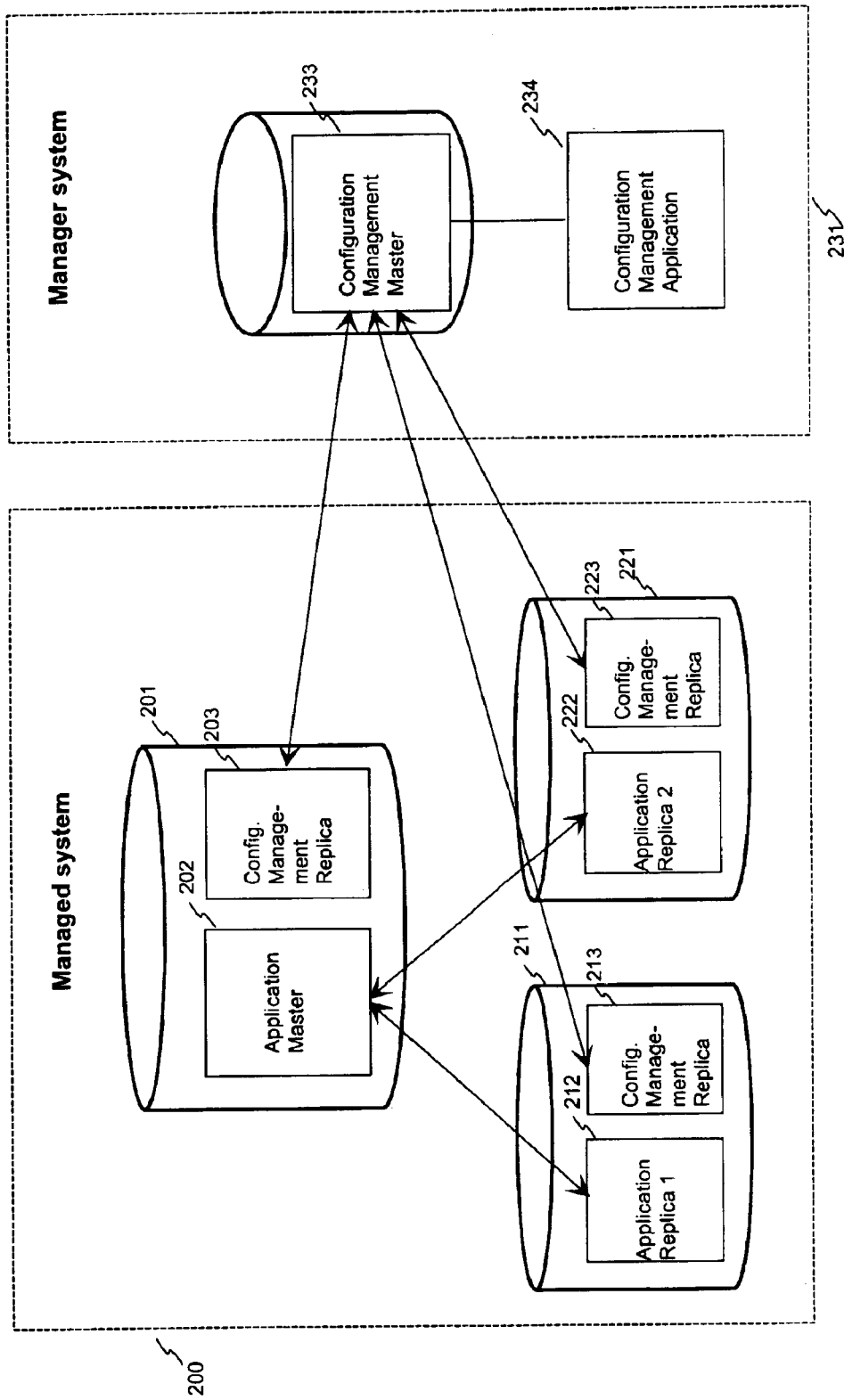
FIG. 2a illustrates the basic units of an exemplary configuration management system according to the invention, wherein the application database hierarchy is different from the schema and application configuration management database hierarchy.

FIG. 1 was described in the prior art description above. FIG. 2a shows an example of an arrangement according to the invention in a case where the application database hierarchy is different from the schema and application configuration management database hierarchy. The arrangement comprises three main components; application master database server 201, application replica database servers 211, 221, and schema management node 231. Application master database node 202 and replica database nodes 212, 222 form a distributed system, wherein the application replica database nodes can maintain a full or partial copy (replica) of the application master database servers' data using suitable data synchronization technology, such as functionality disclosed in patent application document [1] EP 0 860 788. The arrow lines between the blocks mean synchronization relationship between the database servers.

The database schemas are managed by the configuration management node 231.

The configuration management node 231 includes a configuration management application 234 for managing the schemas and application configuration of the database system. There is also a configuration management master 233 stored in the configuration management node, and replicas 203 213, 223 of the configuration management master are stored into database servers 201, 211, 221 of the database system. It is also possible that some application database server does not have a schema management replica if the configuration management data is reliably and quickly available from some other node, such as configuration management master, of the network.

The configuration management replicas may be full or partial copies of the configuration management master 233. The configuration management replicas include scripts for creating and/or updating the schemas and/or application configuration of the databases. The updating between the configuration management master and the configuration management replicas can be made using the synchronization functionality of the servers [1]. Other methods may include direct transfer of schema's managed data from master to replica, or any other methods of information exchange.

Figure 2B:
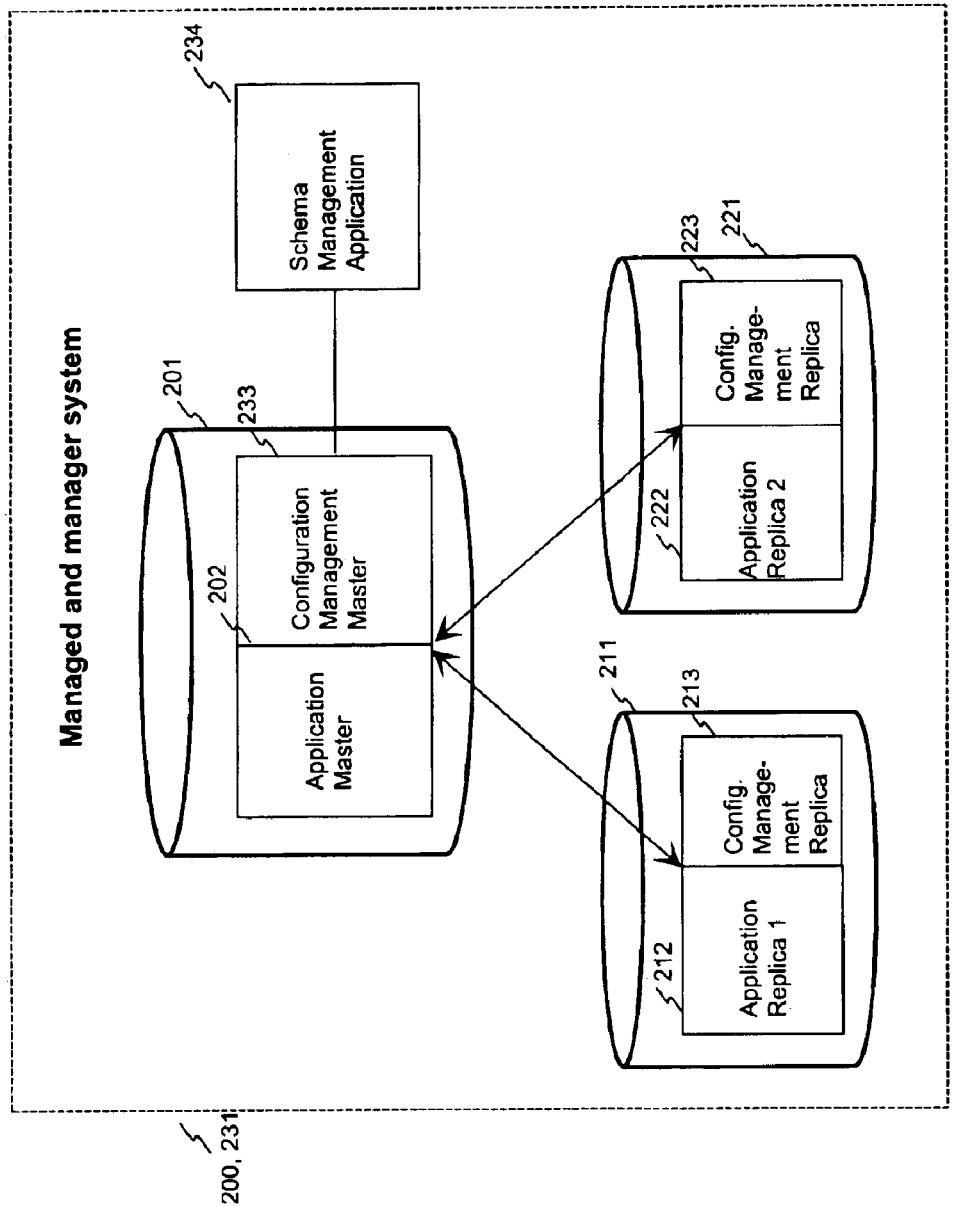
FIG. 2b illustrates the basic units of an exemplary configuration management system according to the invention, wherein the application database hierarchy is the same as the schema and application configuration management database hierarchy.

FIG. 2b shows an example of an arrangement according to the invention in a case where the application database hierarchy is the same as the schema and application configuration management database hierarchy. When the database hierarchies are identical, i.e. both application replica and configuration management replica synchronize their data from the same master node, the application and configuration management replicas can be implemented as one replica node.

In the following exemplary methods for remote configuration management according to the invention are described in more detail referring to FIGS. 3–7.

Figure 3:
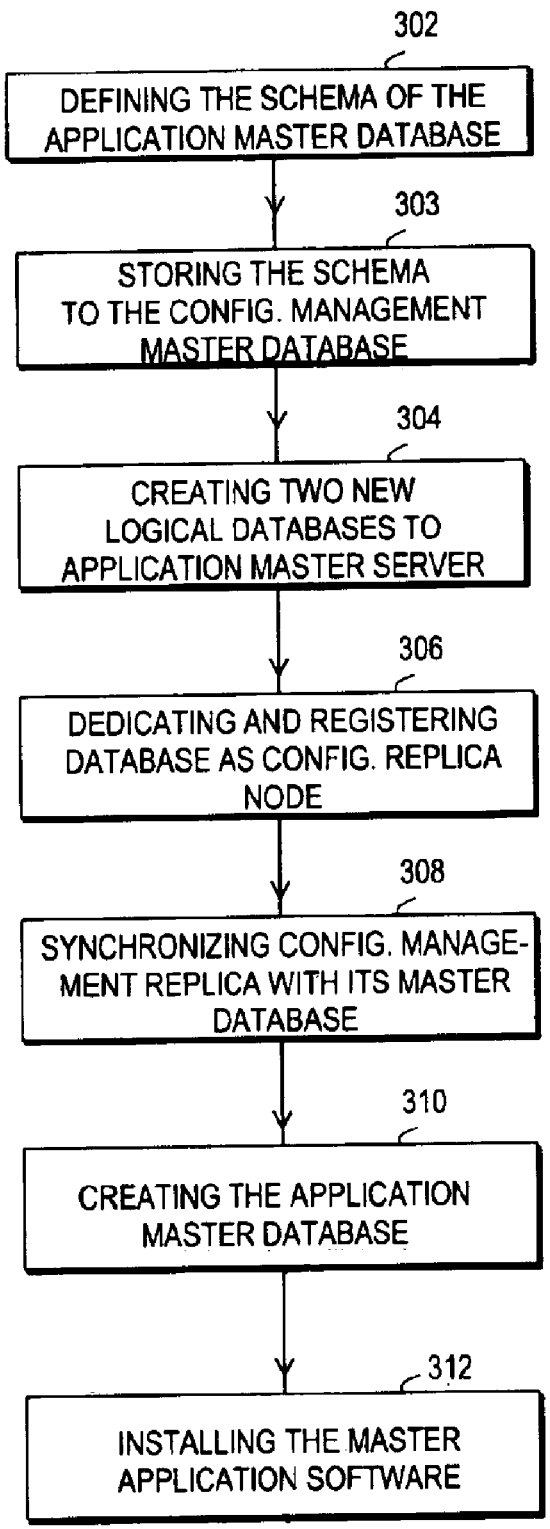
FIG. 3 illustrates a flow diagram of exemplary steps setting up master database according to the invention.

FIG. 3 illustrates a method for setting up master database. In step 302 the database schema is defined using configuration management application and stored to the schema management master database, step 303. If the application database hierarchy is different from configuration database hierarchy, two new, empty logical database nodes are created to the database server where the application master database will reside, step 304. If the hierarchies are identical, these two nodes can be combined into one. In step 306 one of the empty database nodes is dedicated to be the replica node of the configuration management master database and registered with the master. As part of the registration, the identification data, e.g. schema name, of the new application database node is sent to the configuration management master database node. The newly created configuration management replica is then synchronized with its master database in step 308. This downloads the schema creation scripts and possibly also application configuration data such as software binaries and installation programs of the application master to the database server. Next the schema of the application master database node is created using the scripts that were downloaded to the new replica database node, 310. At this phase, also the software configuration data can be extracted from the database and installed, 312. Now the master database node along with the application is ready for use.

Figure 4:
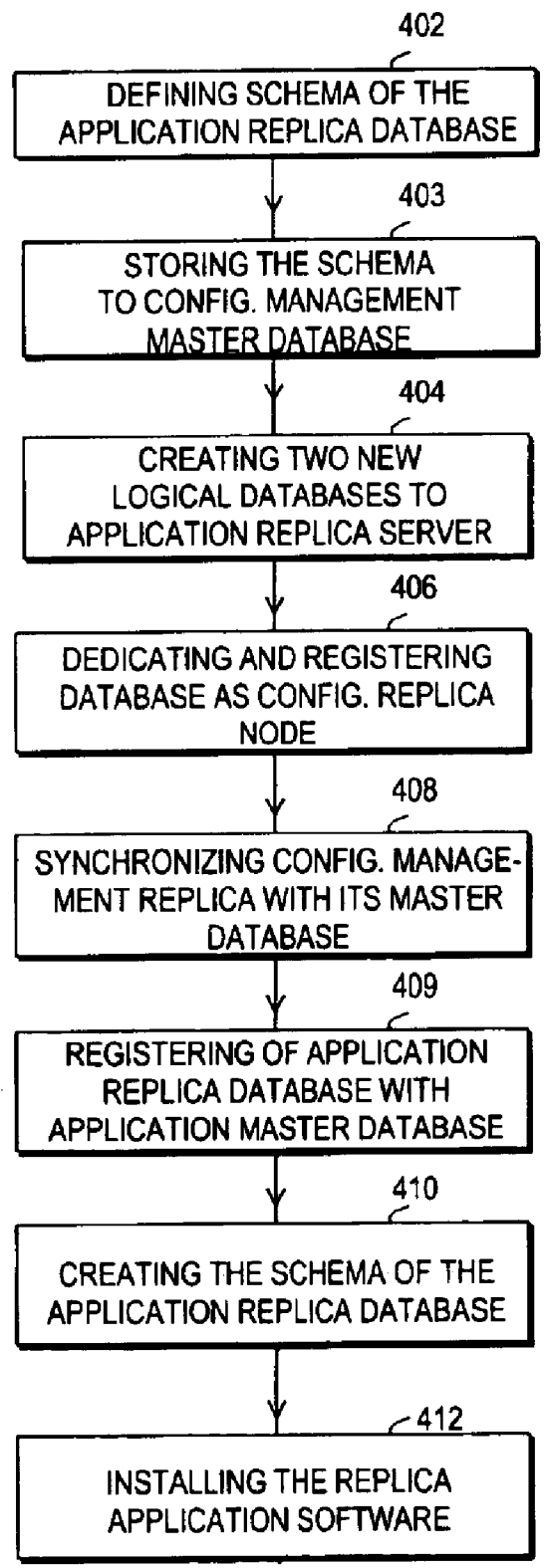
FIG. 4 illustrates a flow diagram of exemplary steps for setting up and registering replica database and installing application software according to the invention.

FIG. 4 illustrates a method for setting up and registering replica database. First in step 402 the database schema and application configuration of the replica database node is defined in using the configuration management application and stored, 403, to the configuration management master database node. This step is typically made at the same time when the configuration of the application's master database schema and applications are defined.

In step 404 two new, empty database nodes are created to the database server where the application replica database will reside. One of the new empty databases of this server is dedicated to be the replica node of the configuration management master database and registered with the configuration management master, step 406. As part of the registration, the identification data, e.g. schema name of the new application database is sent to the configuration management master database node. Next in step 408 the newly created configuration management replica is synchronized with its master database. This downloads the schema creation scripts of the replica and possibly also application configuration data and software to the database node. In step 409 the application replica database node registers itself with the application master database using registration scripts found from the schema management replica of the server. The schema of the application replica database node is created using the scripts that were downloaded to the configuration management replica database node, 410. Finally, the replica application software is installed, 412. If the database hierarchies are identical, i.e. both application replica and configuration management replica synchronize their data from the same master node, the application and configuration management replicas can be implemented as one replica node.

Figure 5:
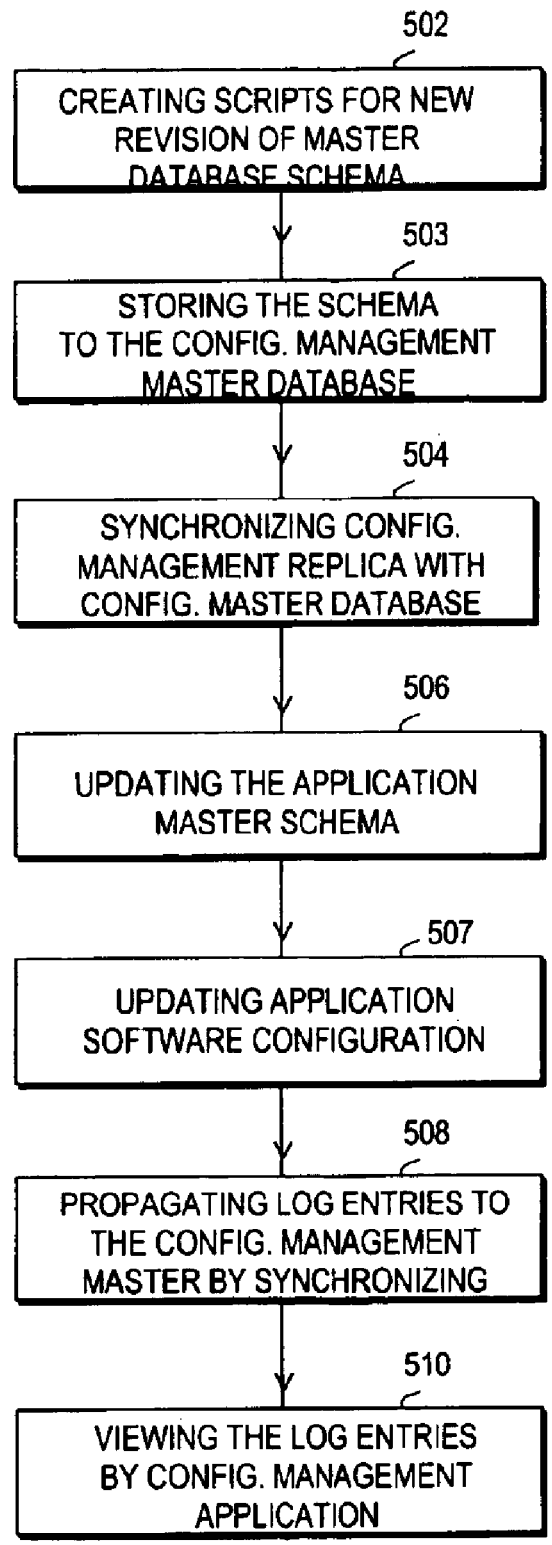
FIG. 5 illustrates a flow diagram of exemplary steps for upgrading the master database schema and application configuration according to the invention.

FIG. 5 illustrates a method for upgrading the master database schema. First in step 502 a set of scripts is created for a new revision of the master database schema in the configuration management application, and stored to the configuration management master, 503. In step 504 the configuration management replica database node of the application master server subscribes the data of the new revision from the configuration management master by synchronizing itself with the master database node. The application master schema is updated by running the scripts of the new revision, 506. The scripts are found from the configuration management replica database of the server. After this, the application configuration can be upgraded by using the application configuration data and software that was downloaded during the synchronization, 507. During the execution of the scripts, log entries can be stored to a table of the configuration management replica. After successful execution of the scripts, the revision level of the application master schema is upgraded. Next in step 508 the log entries written in step 506 are propagated to the configuration management master by synchronizing the configuration management replica database node. The system administrator can review the success of the upgrade by viewing the log entries using the configuration management application, 510.

Figure 6:
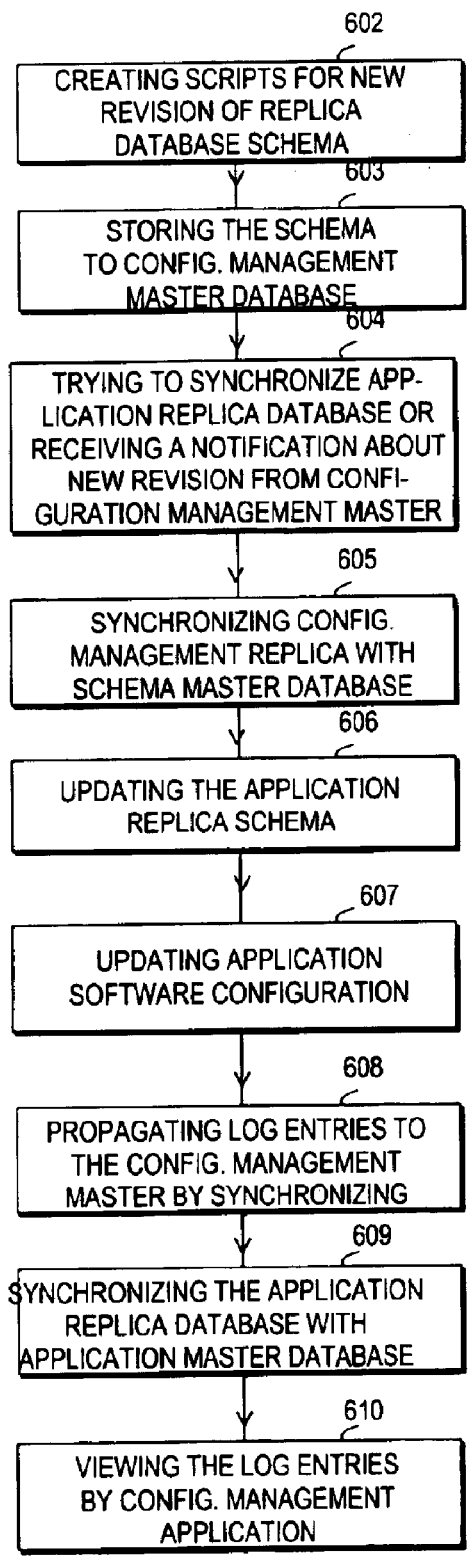
FIG. 6 illustrates a flow diagram of exemplary steps for upgrading the replica database schema and application configuration according to the invention.

FIG. 6 illustrates a method for upgrading the replica database schema and/or application configuration after the master database schema and/or application configuration has been upgraded according to FIG. 5. First in step 602 a set of a new revision (that matches with the earlier created master revision) of the application replica database schema is created in the configuration management application and stored, 603, to the configuration management master. The application replica tries to synchronize with the application master database node in step 604, but fails because the schema of the application master database node has been upgraded to a new revision level. Alternatively, configuration management node can inform the application replica database about the need to upgrade the schema. The configuration management replica database of the application replica server subscribes the upgrade scripts of the new schema and application configuration revision from the configuration management master by synchronizing itself with the master database node, step 605.

Next in step 606 the application replica schema is updated by running the scripts of the new revision. The scripts are found from the configuration management replica database of the server. After this, the application configuration can be upgraded by using the application configuration data and software that was downloaded during the synchronization, 607. During the execution of the scripts, log entries can be stored to a table of the configuration management replica. After successful execution of the scripts, the revision level of the application replica schema is upgraded. The log entries written in step 606 are propagated to the schema management master by synchronizing the configuration management replica database node, step 608. Now that the revision levels of the application master and the replica databases are the same, the application replica database node can synchronize with the application master database node again, 609. The system administrator can review the success of the upgrade by viewing the log entries using the configuration management application, 610.

Figure 7:
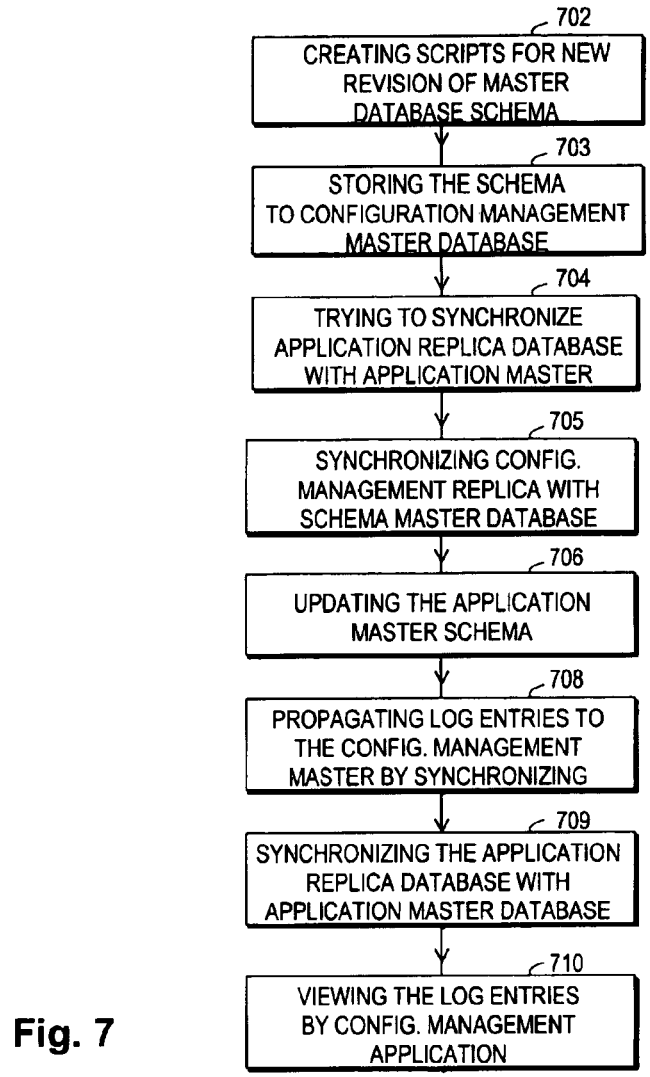
FIG. 7 illustrates a flow diagram of exemplary steps according to the invention for upgrading the master database schema and application configuration after a replica database schema has changed.

FIG. 7 illustrates a method for upgrading the master database schema after a replica database schema has changed (a replica database schema can change similarly as shown in FIG. 5 for the master database schema). First in step 702 a set of a new revision (that matches with the earlier created replica revision) of the application master database schema is created in the configuration management application and stored, 703, to the configuration management master. The application replica tries to synchronize with the application master database in step 704, but fails because the schema of the application replica database has been upgraded to a new revision level. The configuration management replica database node of the application master server subscribes the upgrade scripts of the new revision from the configuration management master by synchronizing itself with the master database node, step 705.

Next in step 706 the application master schema and possibly also application configuration is updated by running the scripts of the new revision. The scripts are found from the configuration management replica database of the server. During the execution of the scripts, log entries can be stored to a table of the configuration management replica. After successful execution of the scripts, the revision level of the application master schema is upgraded. The log entries written in step 706 are propagated to the configuration management master by synchronizing the configuration management replica database node, step 708. Now that the revision levels of the application master and the replica database nodes are the same, the application replica database can synchronize with the application master database node again, 709. The system administrator can review the success of the upgrade by viewing the log entries using the configuration management application, 710.

Figure 8:
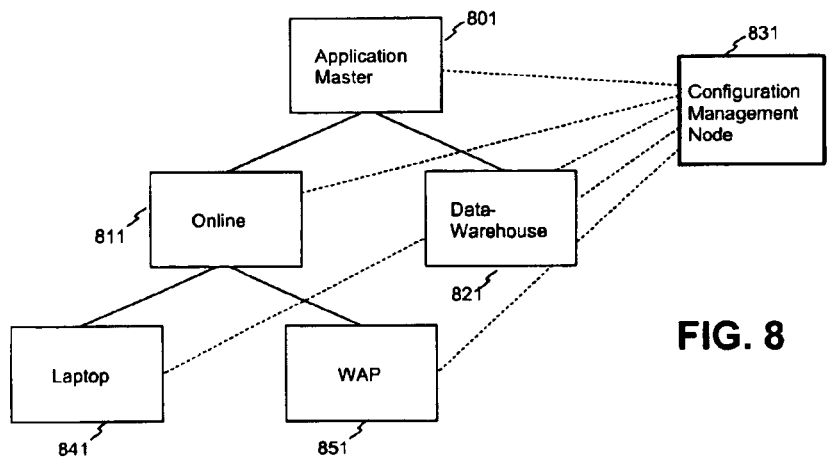
FIG. 8 illustrates an exemplary system environment where the invention can be applied.

FIG. 8 illustrates an example of an equipment environment where the present invention can be applied. The database system comprises the server for application master database node 801, and several servers for application replica database nodes. The application replica database servers include an online station 811, to which a laptop terminal 841 and WAP terminal 851 are connected. There is also a data-warehouse including the application replica database node. A separate configuration management node 831 manages configurations of all the database servers of the database system. The configuration management node 831 has therefore individual synchronization connections to all blocks 801, 811, 821, 841 and 851.

Figure 9:
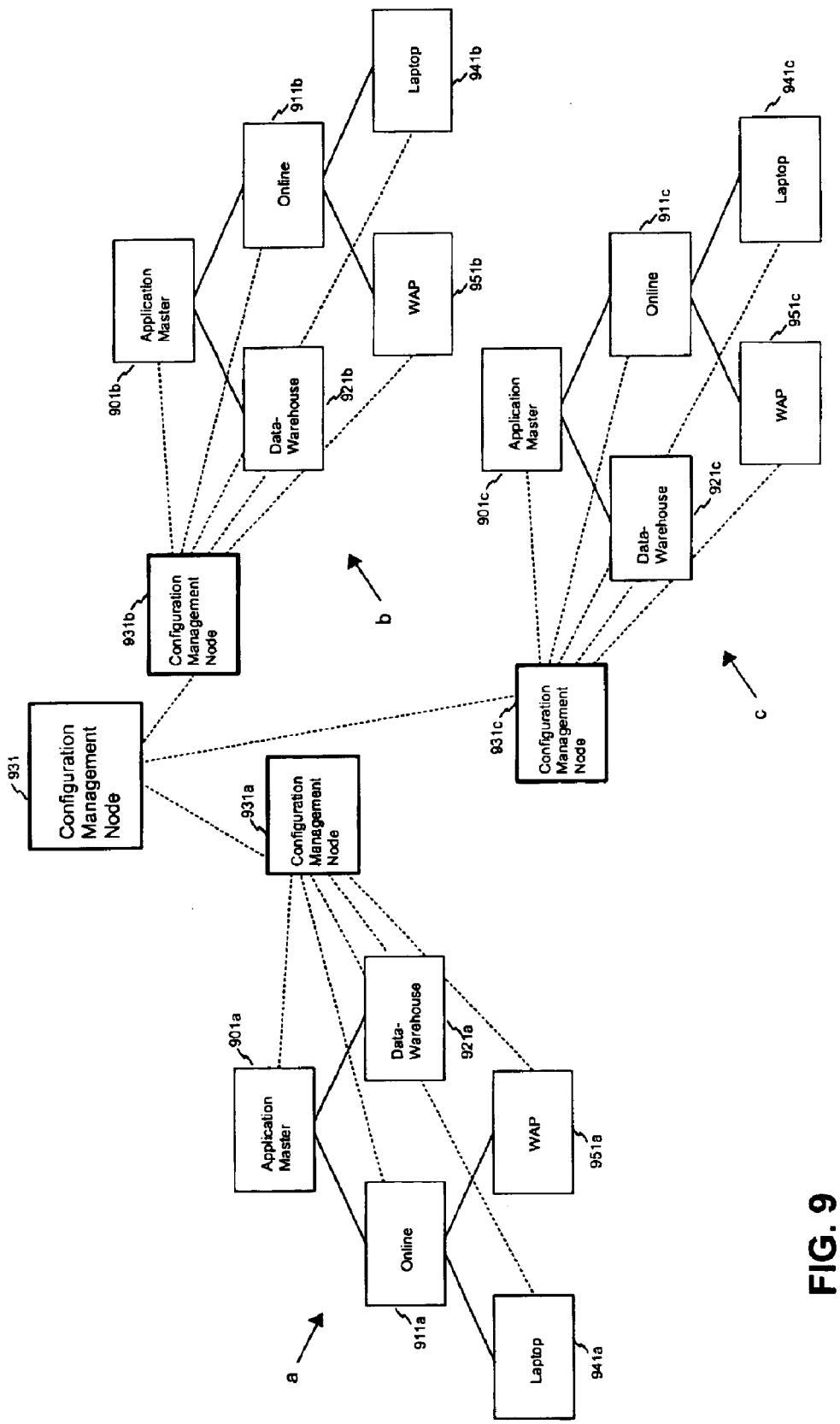
FIG. 9 illustrates a hierarchic system for managing database schemas and application configurations.

FIG. 9 illustrates an example of a hierarchic system where several database systems a, b, c have their respective schema management nodes 931a, 931b and 931c which manage the schemas of the respective database nodes. The database systems have a common configuration management node 931 for managing schemas and application configuration of all database systems a, b and c. The configuration management nodes 931a, 931b and 931c of the individual database systems are thus replicas of the main configuration management node 931. If the hierarchy of the application database is the same as the hierarchy of the configuration management databases, the management database may be included as part of the application database.

A system according to the invention can be implemented by a person skilled in the art with state of the art information technology and communication technology components. A person skilled in the art can implement the functions according to the invention by arranging and programming such components to realize the inventive functions.

For example, the invention can be implemented to work in a telecommunication system, which is complient with at least one of the following: TCP/IP, CDMA, GSM, GPRS, WCDMA, UMTS, Teldesic, Iridium, Inmarsat, WLAN and imode.

It is also possible to use a standardized operating system in the terminals and servers. The operating system of a terminal can be, for example, UNIX, MS-Windows, EPOC, NT, MSCE, LINUX, PalmOS and GEOS. The servers for application master database and schema management application may preferably have at least one of the following operating systems: UNIX, MS-Windows, NT and LINUX.

To a person skilled in the art it is obvious that in order to have an illustrative description the above presented exemplary embodiments have a structure and a function, which are relatively simple. By applying the model presented in this application it is possible to design different and very complicated systems, which in obvious ways to the expert, utilise the inventive idea presented in this application.

One should note that, although embodiments concerning schema configuration management are described, the invention is also well applicable to application configuration management.

What is claimed is:

1. A method for managing database application configuration data in at least one database system comprising at least one application master database node, at least one application replica database node, at least one application having access to the application master database node or the replica database node, at least one configuration management master database node and at least one configuration management replica database node, wherein the at least one configuration management master database node and at least one configuration management replica database node are for managing at least one of the at least one application master database node, the at least one application replica database node and/or at least one application, the method which comprises the steps of:

storing new configuration data in the configuration management master database node, synchronizing at least part of the configuration data to the at least one configuration management replica database node, and altering the configuration of the at least one application master database node and/or at least one application replica database node and/or application on the basis of at least part of the configuration data of the at least one configuration management replica database.

2. A method according to claim 1, wherein the method further comprises the steps of:

storing information about configuration status of the application master database and/or application replica database by the at least one configuration management replica database node, and synchronizing the information about the configuration status to the at least one configuration management master database node by the at least one configuration management replica database node.

3. A method according to claim 1, wherein a schema of the application master database node and/or a schema of the application replica database node is altered on the basis of the configuration data.

4. A method according to claim 1, wherein configuration parameters of the application are altered on the basis of the configuration data.

5. A method according to claim 1, wherein the configuration data comprises application software binaries.

6. A method according to claim 1, wherein the configuration data comprises at least one application installation program.

7. A method according to claim 1, wherein at least one configuration management replica database node is managed by a data management system, wherein at least one application master database or at least one application replica database is managed with the same data management system.

8. A method according to claim 1, wherein at least one configuration management replica database node is managed by a data management system, wherein not any application master database nor application replica database is managed with the same data management system.

9. A method according to claim 1, wherein at least one configuration management master database node is managed by a data management system, wherein at least one application master database or at least one application replica database is managed with the same data management system.

10. A method according to claim 1, wherein at least one configuration management master database node is managed by a data management system, wherein not any application master database nor application replica database is managed with the same data management system.

11. A storage media comprising a stored, readable computer program, wherein the program comprises instructions for controlling a database system or components thereof to implement a method according to claim 1.

12. An arrangement for managing database application configuration data in at least one database system, wherein the database system comprises at least one application master database node, at least one application replica database node, and at least one application having access to the application master database node or to the replica database node, wherein the arrangement comprises:

at least one configuration management master database node, and at least one configuration management replica database node, wherein the at least one configuration management master database node and at least one configuration management replica database node are for managing at least one of the at least one application master database node, the at least one application replica database node and/or at least one application;

a means for storing new configuration data in the configuration management master database node, a means for synchronizing at least part of the configuration data to the at least one configuration management replica database node, and a means for altering the configuration of the at least one application master database node and/or at least one application replica database node and/or application on the basis of at least part of the configuration data of the at least one configuration management replica database.

13. An arrangement according to claim 12, wherein:

the at least one configuration management replica database node is arranged to store information about configuration status of the application master database and/or application replica database, and the at least one configuration management replica database node is arranged to synchronize the information about the configuration status to the at least one configuration management master database node.

14. An arrangement according to claim 12, wherein the arrangement comprises means for altering a schema of the application master database node and/or a schema of the application replica database node on the basis of the configuration data.

15. An arrangement according to claim 12, wherein the arrangement comprises means for altering configuration parameters of the application on the basis of the configuration data.

16. An arrangement according to claim 12, wherein the configuration data comprises application software binaries.

17. An arrangement according to claim 12, wherein the configuration data comprises at least one application installation program.

18. An arrangement according to claim 12, wherein a data management system is arranged to manage at least one configuration management replica database node, wherein the same data management system is arranged to manage at least one application master database or at least one application replica database.

19. An arrangement according to claim 12, wherein a data management system is arranged to manage at least one configuration management replica database node, wherein the same data management system is arranged not to manage any application master database or any application replica database.

20. An arrangement according to claim 12, wherein a data management system is arranged to manage at least one configuration management master database node, wherein the same data management system is arranged to manage at least one application master database or at least one application replica database.

21. An arrangement according to claim 12, wherein a data management system is arranged to manage at least one configuration management master database node, wherein the same data management system is arranged not to manage any application master database or any application replica database.

* * * * *